United States Patent [19]
Bejan et al.

[11] Patent Number: 5,465,384
[45] Date of Patent: Nov. 7, 1995

[54] AUTOMATIC POLLING AND DISPLAY INTERACTIVE ENTERTAINMENT SYSTEM

[75] Inventors: Robert S. Bejan; Kevin P. Centanni, both of New York; Scott R. Gaertner, Brooklyn, all of N.Y.; William I. Franzblau, Morristown, N.J.

[73] Assignee: Actifilm, Inc., New York, N.Y.

[21] Appl. No.: 981,193

[22] Filed: Nov. 25, 1992

[51] Int. Cl.$^6$ .................................................. H04H 9/00
[52] U.S. Cl. ......................... 455/2; 348/1; 348/2; 348/8
[58] Field of Search ........................... 455/2, 3.1, 4.1, 455/4.2, 5.1, 6.3, 6.1; 358/84, 86; 379/92; 348/1, 2, 8, 13; 434/321

[56] References Cited

U.S. PATENT DOCUMENTS

| | | | |
|---|---|---|---|
| 3,318,517 | 5/1967 | Wells et al. | 235/52 |
| 4,290,141 | 9/1981 | Anderson et al. | 348/1 |
| 4,305,131 | 12/1981 | Best | 364/521 |
| 4,333,152 | 6/1982 | Best | 364/521 |
| 4,361,903 | 11/1982 | Ohta | 455/2 |
| 4,381,522 | 4/1983 | Lambert | 455/4.2 |
| 4,445,187 | 4/1984 | Best | 364/521 |
| 4,569,026 | 2/1986 | Best | 364/521 |
| 4,591,248 | 5/1986 | Freeman | 352/133 |
| 4,647,980 | 3/1987 | Steventon et al. | 358/86 |
| 4,745,468 | 5/1988 | Von Kohorn | 358/84 |
| 4,841,291 | 6/1989 | Swix et al. | 340/725 |
| 4,846,693 | 7/1989 | Baer | 434/308 |
| 4,866,515 | 9/1989 | Tagawa et al. | 358/86 |
| 4,884,972 | 12/1989 | Gasper | 434/185 |
| 4,991,011 | 2/1991 | Johnson et al. | 358/86 |
| 5,036,389 | 7/1991 | Morales | 358/84 |
| 5,101,364 | 3/1992 | Davenport et al. | 395/152 |
| 5,111,409 | 5/1992 | Gasper et al. | 395/152 |
| 5,148,154 | 9/1992 | MacKay et al. | 340/712 |
| 5,161,034 | 11/1992 | Klappert | 358/342 |
| 5,237,648 | 8/1993 | Mills et al. | 395/133 |
| 5,273,437 | 12/1993 | Caldwell et al. | 455/2 |
| 5,274,758 | 12/1993 | Beitel et al. | 395/154 |
| 5,276,789 | 1/1994 | Besaw et al. | 395/140 |
| 5,278,951 | 1/1994 | Camacho et al. | 395/140 |
| 5,287,489 | 2/1994 | Nimmo et al. | 395/500 |
| 5,307,456 | 4/1994 | MacKay | 395/154 |

FOREIGN PATENT DOCUMENTS

| | | |
|---|---|---|
| 72709/87 | 11/1987 | Australia . |
| 35988/89 | 12/1990 | Australia ........................ A61B 5/16 |
| 0444260A2 | 12/1990 | European Pat. Off. .......... A63F 9/22 |
| WO92/08531 | 5/1992 | WIPO . |

OTHER PUBLICATIONS

"Interactive Video wall Honors the 'Immigrant Spirit'", *Presentation Products Magazine*, Feb. 1991.

Primary Examiner—Reinhard J. Eisenzopf
Assistant Examiner—Nguyen Vo
Attorney, Agent, or Firm—Marshall, O'Toole, Gerstein, Murray & Borun

[57] ABSTRACT

An interactive entertainment system allows an audience to select the perspective or plot of an interactive episode. The audience is provided with polling units with which to vote during scenes of the episode. A polling computer and main computer tabulate the results of the voting and then select a series of images stored on a videodisk to be played by a videodisk player and transmitted to a video projection unit.

25 Claims, 4 Drawing Sheets

AUTOMATIC POLLING AND DISPLAY INTERACTIVE ENTERTAINMENT SYSTEM

BACKGROUND OF THE INVENTION

The present invention relates generally to an entertainment apparatus in which the audience participates in the creation of the entertainment and more particularly to a device which permits the audience to select video images to control the perspective or plot of a film.

BACKGROUND ART

Many live theaters present productions in which the actors poll members of the audience in order to determine how the play being performed will end. That type of improvisational or interactive theater, however, allows the audience only limited participation in the production. Generally, the audience is polled only once and there is no opportunity for audience members to change their selection. Moreover, such schemes have not been used with filmed or videotaped presentations because of the inability to simply and easily poll the audience and then change the images on the film or videotape in accordance with the results of the polling.

While films and videotapes have not been subject to audience interaction in the past, there are many entertainment systems, such as computer or video games or interactive compact discs, in which user input controls the series of images placed on a screen. However, these systems do not permit users the ability to determine the plot of a story or the perspective from which that story is presented or allow a large number of users to vote on choices presented in the story. Moreover, given the general public's unfamiliarity with interactive entertainment systems, such systems must be simple to use and relatively inexpensive. Since the system will generally be used in a movie theater, it should be designed so that it can be easily retrofitted into a theater.

There are numerous possible ways to allow an audience to participate in the entertainment, with each type of participation requiring different degrees of familiarity with equipment and proficiency with its use. Thus a more successful interactive entertainment system must allow new users to perform simpler interactive tasks initially and then progress to more complicated interaction once users have become familiar with the equipment.

SUMMARY OF THE INVENTION

In accordance with the present invention, an interactive entertainment system has a means for retrieving an image from a storage medium and a display coupled to the retrieving means. A means for conducting a poll of an audience includes a pair of polling units with each unit having means for registering a user choice. The conducting means includes means coupled to the polling units for tabulating user choices. The conducting means causes the retrieving means to supply a stored image to the display based on the tabulated user choices.

The display presents a series of images with the series ending in at least one image which provides at least two choices, each choice corresponding to a further series of images stored in the storage medium. The storage medium may include a videodisk, the retrieving means a videodisk player and the display a video projection system. The images in the storage medium are stored at time addresses.

Each polling unit has at least two pushbuttons where each pushbutton corresponds to a user choice. The polling units have a housing and each housing may have a message readout. The housing of each polling unit may be attached to a theater chair by shaping the polling unit like a pistol grip and attaching it to the armrest of the theater chair. The housings of each polling unit may be connected to each other in an elongated bar.

The poll conducting means includes means for converting signals from the polling unit into further signals which are tabulated by the tabulating means. The conducting means further comprises means for sending a signal to the retrieving means when a user choice has been selected at a threshold number of polling units. The storage medium stores at least two series of images, each image in each series corresponding to images in each of the other series.

The display presents a first series of stored images when a first user choice is selected at a first threshold number of polling units and the display presents a second series of stored images when a second user choice is selected at a second threshold number of polling units. The first and second threshold numbers may be equal. Each image in the first series corresponds with an image in the second series and the retrieving means retrieves images from the second series beginning with an image in the second series corresponding to an image of the first series next following the image of the first series which was last retrieved from the storage medium.

The tabulating means transmits a tabulation image to the display and the tabulation image overlays the image on the display retrieved from the storage medium.

The polling units may be divided into at least two groups and the conducting means may include at least two junction boxes. Each junction box is connected to a group of polling units and each junction box records the user choices registered at the polling units within a group and transmits those choices to the tabulating means. The junction boxes may include a digital latch card and a microprocessor. The microprocessor records the user choices as a string of characters and transmits the string of characters to the tabulating means.

The retrieving means may include at least two videodisk players. The videodisk players are connected to a routing switcher which receives images from the videodisk players and sends them to the display.

BRIEF DESCRIPTION OF THE DRAWINGS

Other features and advantages of the invention will be apparent from the following description taken in connection with the drawings wherein.

DETAILED DESCRIPTION

Figure 1:
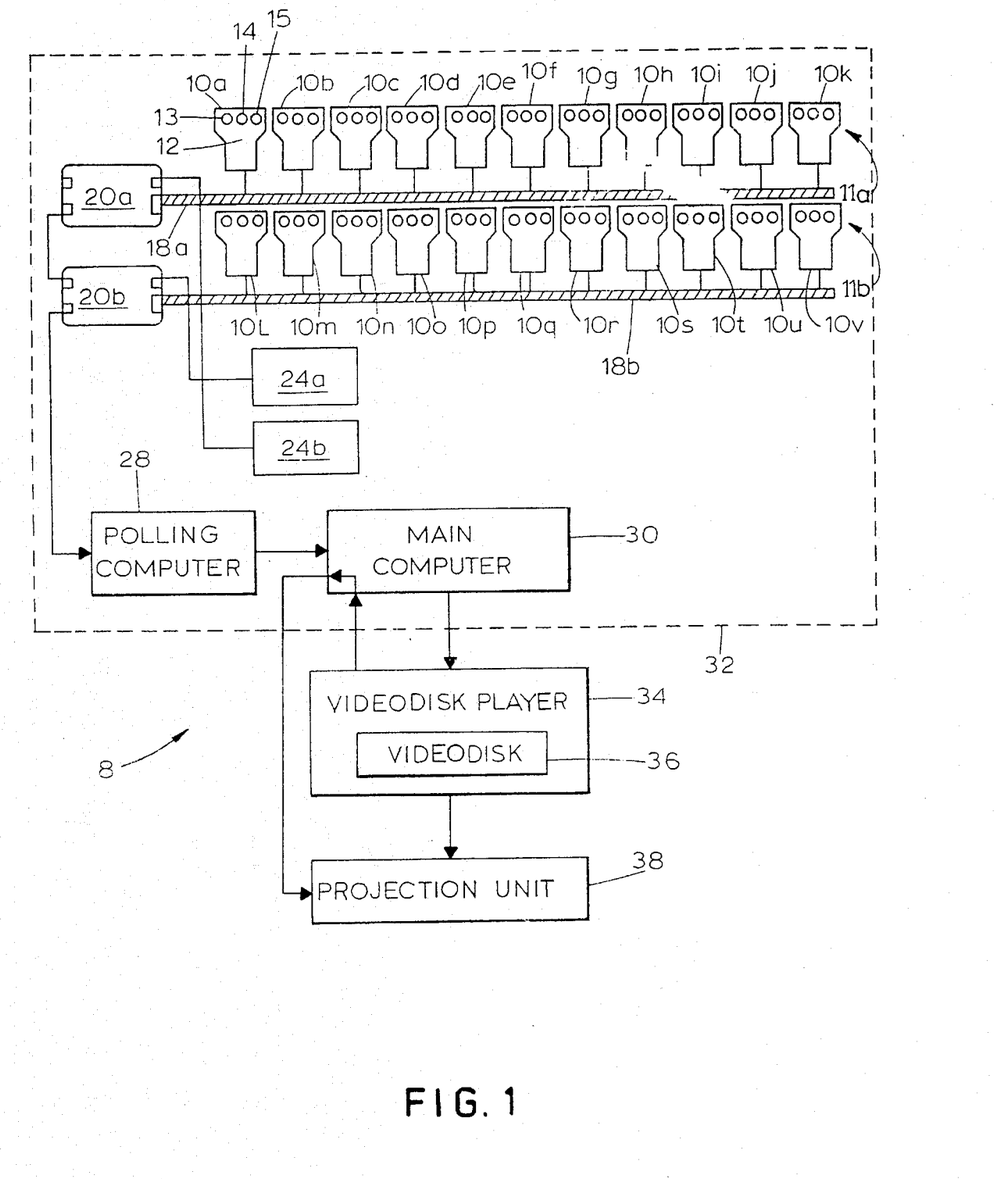
FIG. 1 is a block diagram of the interactive entertainment system of the present invention.

Referring initially to FIG. 1, an interactive entertainment system 8 has a plurality of polling units 10a–10k and 10l–10v, shown arranged in two rows 11a, 11b, respectively. Each of the polling units 10a–v, for example the unit 10a, has a housing 12 with three pushbuttons 13, 14 and 15, which a user may depress or actuate to make user choices as more fully described below. The diagram of FIG. 1 shows two rows of polling units 10 with eleven polling units in each row. The interactive entertainment system 8 is designed to be used in a movie theater or other room or auditorium capable of displaying images to at least two, and preferably a large number of individuals. Thus, the number of polling units 10 and their precise construction will be dependent on the size and type of theater or other room into which the system 8 is placed. Although the system 8 is primarily addressed to the control and display of visual images, sounds such as music or spoken words will generally accompany those visual images. The term "images" as used herein should, therefore, be understood to include either visual images, sounds or both.

While three pushbuttons 13–15 for each polling unit 10 are depicted in FIG. 1, a different number of pushbuttons may be used depending on the nature of the interactive entertainment to be displayed or played back by the system 8. Other means of selecting choices may be substituted for the pushbuttons 13–15 so long as the polling units 10 are capable of registering and sending a signal based upon a user's selection of one of at least two choices. Since the system will generally be used in a darkened theater, it is advantageous, although not necessary, to have lighted pushbuttons and to have each of the pushbuttons glow with a different color. The colors can then be correlated to choices presented to the audience.

Figure 5:
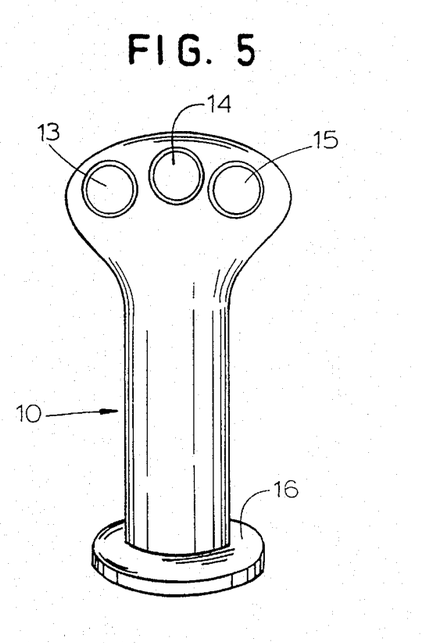
FIG. 5 is a front-elevational view of a joystick which may be used with the system of FIG. 1.
Figure 6:
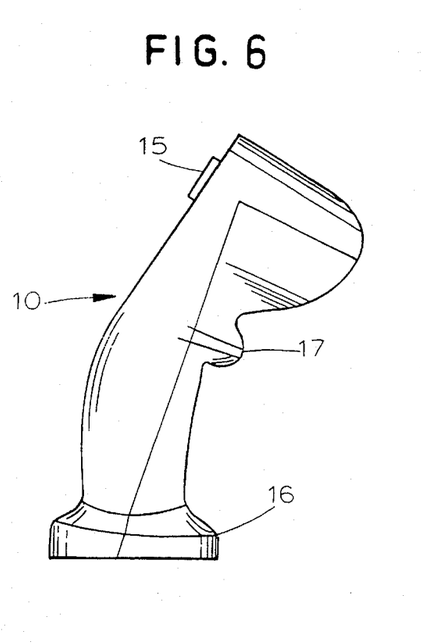
FIG. 6 is a side-elevational view of the joystick of FIG. 5.

The polling units 10 will be used repeatedly by individuals who are not familiar with the system and thus must be strong and easy to use. Further, the polling units 10 and other components of the system 8 should be constructed so that the theater can be easily and inexpensively retrofitted with the interactive entertainment system 8. According to one embodiment, polling unit 10 is mounted on an armrest or other portion of an associated seat to be occupied by a user. As shown in FIGS. 5 and 6, some or all the polling units 10 may incorporate a joystick or a pistol grip placed onto the armrest of an associated seat. The pushbuttons 13, 14 and 15 are placed towards the top of the joystick so that they can be easily depressed by a user's thumb. The base 16 of the joystick may have holes (not depicted) for attaching screws or bolts to the armrest of a seat. As shown in FIG. 6 the joystick may have a hand grip 17 for receiving a user's fingers when they are wrapped around the joystick. The joystick may be fabricated out of metal, ceramic or a plastic material so long as it is sturdy and will withstand repeated use. The wiring associated with each polling unit 10 can then be routed from the base 16, through a shallow channel on the underside of the armrest, through a hollow metal side of the seat and into a conduit 18a or 18b (FIG. 1) which may be mounted under the seats, for example, on the floor.

Alternatively, an elongate housing in the form of a long channel or hollow bar made of metal or another suitable material and spanning one or more seats may be attached to the back of a first row of the seats. Polling units for other seats would similarly be mounted on channels or hollow bars mounted on the backs of seats in the next row forward. In the case of the front row, the polling units may be mounted on a channel or hollow bar mounted on uprights forward of the front row, or may be mounted in the armrests or another portion of each seat as desired. The pushbuttons are then mounted on the channel or hollow bar in groups directly in front of seats in a second row behind the first row so that users in the second row could advantageously make their choices. In each case, all wiring for the polling units 10 could advantageously be contained in the channel or hollow bars and/or conduits below the seats.

Figure 4:
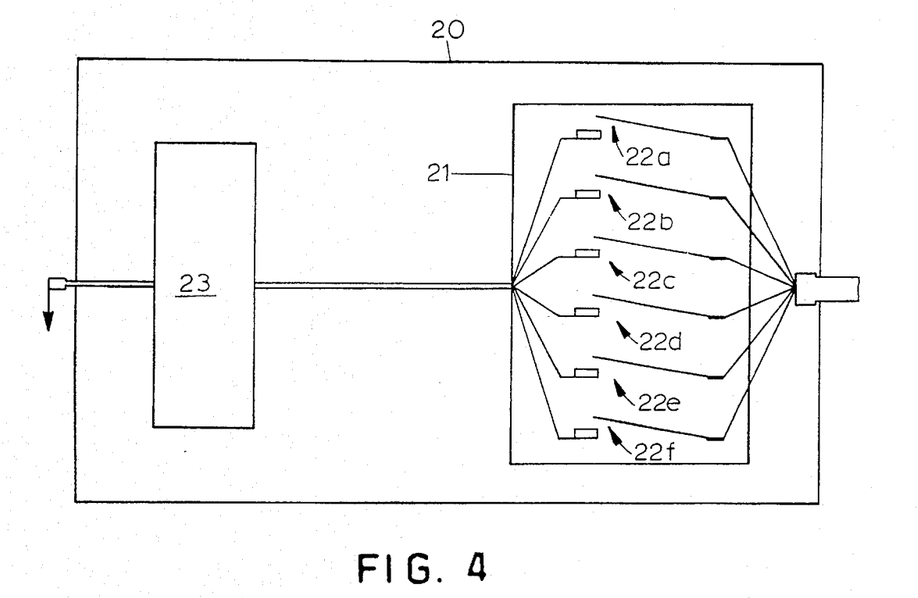
FIG. 4 is a block diagram of the junction boxes shown in block diagram form in FIG. 1.

At the end of each row 11a, 11b of seats is a junction box 20a, 20b, respectively. Each junction box 20a, 20b is connected to each polling unit in that row by a six-conductor modular telephone cable or other wiring. A wireless system could also be used to transmit choices from the polling units 10 to the rest of the system. The eleven six-conductor modular cables from each row of the polling units 10 plug into the junction boxes 20. FIG. 4 diagrammatically depicts the internal structure of junction boxes 20. Inside each junction box 20 are a number of digital input cards 21 (FIG. 4). In this case only digital input card 21 is shown but more or less may be used depending on the capacity of the cards and the number of polling units 10 connected to each junction box 20. The input cards 21 have electronic latches 22a–f, one latch for each pushbutton, which are triggered or closed when a pushbutton is depressed. In FIG. 4 only 6 latches are shown but, in order to service all 33 pushbuttons in the rows depicted in FIG. 1, 33 latches would be required, and thus either more latches per input card or more input cards. The digital input cards 21 are linked via a parallel bus to a microprocessor 23, also in the junction boxes 20, which scans the input cards 21 to determine which latches 22 are closed. There will be groups of three latches for each polling unit 10, since each polling unit 10 has three pushbuttons 13–15. The microprocessor 23 then converts the information for each group of latches 22 into a binary code: 0 if no pushbutton in the group was depressed; 1 if the pushbutton 13 was depressed; 2 if the pushbutton 14 was depressed; and 4 if the pushbutton 15 was depressed. The microprocessor 23 then opens all latches 22. The digital input cards may be purchased from Alpha Products of Fairfield, Conn. or other manufacturers making similar digital input cards. The microprocessor may be purchased from Intel Corporation of Santa Clara, Calif.

After converting the information in each group into a binary code, the microprocessor 23 creates a string of characters representing the choices registered at each polling unit 10. Since there are eleven polling units, the string will have eleven characters with each character being a 0, 1, 2 or 3 representing no pushbutton depressed or pushbutton 13, 14 or 15 depressed, respectively. If the polling units 10 include more than three pushbuttons, there would then be more than four different numbers possibly encoded and sent to the polling computer 28 indicating pushbutton actuation. Similarly, if there are more than eleven polling units in each row, each junction box would send a string of a corresponding number of characters. In any case, the network of junction boxes 20 will communicate the choices made or whether no choice has been made at each of the polling units 10.

Each junction box 20 is connected to a DC power source 23. The DC power sources 24 provide power to the microprocessor 24 inside each junction box and also provide power to light the pushbuttons 13–15.

The junction boxes 20 are daisy-chained together into a network by four-conductor telephone cable. The network of junction boxes 20 is connected to and supplies signals to a polling computer 28. In response to a data request signal from the main computer 30, the polling computer 28 sends a signal to the junction boxes 20 instructing the microprocessors 23 in those junction boxes 20 to send its string of eleven characters to the polling computer 28. The polling computer 28 may send a signal to each junction box 20 requesting its string of characters or may send one signal to all junction boxes 20 simultaneously.

The polling computer 28 may be any personal computer, including an IBM PC compatible 80486 microcomputer system with multiple serial ports. Dedicated hardware could be used as the polling computer 28 instead of a programmable personal computer, if desired. The polling computer must be suitably programmed to receive the strings of characters from the junction boxes 20, store the strings and convert them into a form which can be used by the main computer 30. The polling computer 28 may send the strings of characters directly to the main computer 30 or it may tabulate votes represented by the strings. For instance, the polling computer may tabulate the number of polling units 10 at which each of the three choices has been made. That tabulation could then be sent to the main computer 30. The polling computer 28 may also have a diagnostic package in which it determines whether the polling units are operating properly. The polling computer may also store information on all votes taken during a performance for later review.

Latches could be placed in the polling units 10 and connected directly to the polling computer 28. The use of the junction boxes, however, is advantageous in that the polling computer 28 will be connected to fewer inputs since there are fewer junction boxes than polling units. The fewer inputs connected to the polling computer, the faster the polling computer will be able to retrieve information on the choices selected by the users.

The main computer 30 is normally a suitably programmed personal computer such as a Macintosh IICi manufactured by Apple Computer of Cupertino, Calif. If a Macintosh 2CI is used, it may have a Nu Vista Card manufactured by Truvision of Indianapolis, Ind. or similar overlay card in order to perform some of the image creation and transmittal functions discussed below. Dedicated hardware could be used as the main computer 30 instead of a programmable personal computer, if desired. The polling computer 28 can be connected to the main computer 30 at a serial or parallel I/O part thereof. The main computer 30 receives the tabulation from the polling computer 28 regarding which pushbuttons on the polling units 10 have been selected. Together, the polling units 10, junction boxes 20, polling computer 28 and main computer 30 serve as a means 32 for conducting a poll. Instead of using a separate polling computer 28 and main computer 30, one computer could be used to perform all the functions performed by both. Since, however, the main computer 30 will be performing the numerous operations discussed below, it is advantageous to have two computers so that the various functions can be performed more quickly. The division of functions between the polling computer 28 and main computer 30 may also be varied as desired.

Referring again to FIG. 1, the system 8 has a means for retrieving one or more images from a storage medium. In the preferred embodiment, the retrieving means comprises a videodisk player 34, which retrieves images from a replaceable videodisk 36. The videodisk 36 has many series of video images stored on it, each series corresponding to a separate scene in the interactive presentation. The videodisk 36 may have images stored on it based on the Society of Motion Picture and Television Engineers' (SMPTE) time code. SMPTE time code is a standardized measurement for all media in which images are stored at a time address and is based on hours, minutes, seconds and frames. The SMPTE time code may be also used by the main computer 30 in retrieving images from the videodisk 31. When a videodisk is pressed or created, the images are indexed at particular addresses on the videodisk using, for instance, frame numbers, and those addresses may be used by the main computer 30 in retrieving and identifying images. A videodisk and videodisk player are advantageous for storing and retrieving the images because the indexing feature of the videodisk players allows for almost instantaneous access to any series of images stored on the videodisk. Other storage and retrieval systems could be used in place of a videodisk and videodisk player, so long as they are capable of storing the images at easily accessible addresses and retrieving those images quickly.

The videodisk player 34 is preferably, although not necessarily, a professional model such as a Pioneer LD-V8000 Industrial Laserdisk Player, which is capable of being controlled by a personal computer. The videodisk player 34 may be connected to a projection unit 38 which displays the images sent from the videodisk player 34 on a screen in the theater. A suitable projection unit is a Sony 1251 video projector. The videodisk player 34 may also be connected back to the main computer 30 so that video images are sent to the main computer 30, which then sends the images to the projection unit 28. The videodisk player 34 should have a frame buffer which will continue to display an image when the player is switching from one videodisk track to another. The frame buffer will prevent the theater screen from being entirely blank when scene switching pursuant to audience voting occurs.

The projection unit 38 is also capable of displaying images sent from the main computer 30 indicating the percentages for each choice entered at the polling units 10. The main computer 30 sends an image to the projection unit 38, and that image overlays the images sent from the videodisk player 34 to the main computer 30. In that way the relative percentages for each choice can be superimposed on an image at any time. By updating the superimposed information on the screen, the audience will be able to see how voting is proceeding during the interactive presentation. In order to improve the quality of the displayed images, two projection units may be used to simultaneously display images. If more than one projection unit is used, a video redistribution amplifier, such as the model 3010 manufactured by Inline, Inc. of La Habra, Calif., may be placed between the source of images and the projection units. If the presentation to be displayed is lengthy, more than one videodisk player may be attached to the main computer 30 to effectively increase the number of video images which can be stored in the system. A model 553-5/1 routing switcher made by Omnicron Video of Pasedena, Calif., placed between the main computer 30 and the two or more videodisk players will receive signals from the main computer 30 and then control which videodisk player sends images to the projection unit 38 or back to the main computer 30 for further routing to the projection unit 38.

In order to control the videodisk player 34 based on the information from the polling computer 28, the main computer 30 must have software and data concerning the images stored in the videodisk 36. A suitable software system is the MacroMind Director Version 3.1 licensed by MacroMind, Inc. of San Francisco, Calif. The software allows the main computer to store information concerning the SMPTE time code or other address of images or series of images stored on the videodisk 36, and allow the main computer 30 to access the stored images from the videodisk 36 based on the SMPTE time.

Figure 2:
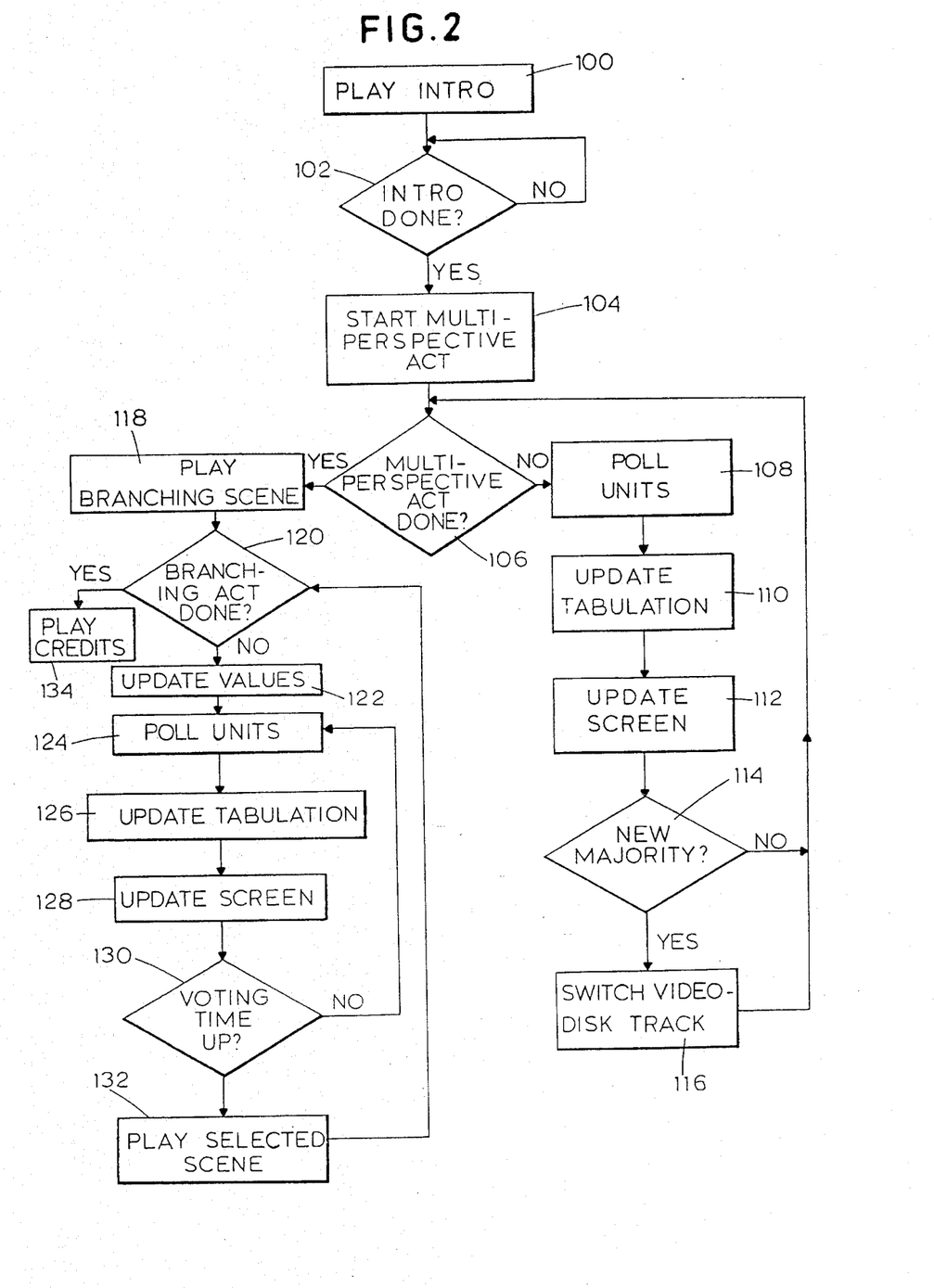
FIG. 2 is a generalized flowchart illustrating the control program executed by the main computer shown in block diagram form in FIG. 1.

FIG. 2 is a block diagram depicting the steps taken by the main computer 30 in carrying out the operations necessary to display a sample interactive episode. The sample episode depicted is divided into three parts: an introduction, a multi-perspective act and a branching act. Although this sample episode has both a multi-perspective act and a branching act, a single episode might have only one of those acts. In the sample episode the multi-perspective act precedes the branching act, which has advantages which will be discussed below. The order of the acts could, however, be reversed.

The program begins at a block 100 when a projectionist manually starts the main computer 30 which then directs the videodisk player 34 to play the introduction. During the introduction the audience is introduced to the system's equipment and general guidelines on how each individual in the audience will interact with the episode. During the introduction the audience is also introduced to various characters which will be present in the episode. A block 102 monitors the playing of the introduction to determine when the introduction concludes and to begin the multi-perspective act. Monitoring can be accomplished in one of two ways. First the main computer could receive feedback from the videodisk player 34 in order to determine when the introduction is complete. The time addresses of the images being retrieved can be transmitted to the main computer 30 and those time address can be used to trigger various functions of the main computer 30. Alternatively, the main computer 30 can be programmed with information on the length of the introduction or other scene in order to separately time when the introduction or other scene is complete.

Once the introduction is complete, control passes to a block 104 which sends a signal to the videodisk player 34 to begin the multi-perspective act. During the multi-perspective act the audience will choose which one of three different perspectives from which to view the act. The number of possible perspectives preferably corresponds to the number of pushbuttons in the polling units 10. In this instance, the audience is given a choice of three perspectives. Each perspective is roughly equivalent to following one of the previously introduced characters through the act. During the multi-perspective act, it is only the perspective which is changed by the audience's choice, and not the plot or series of events which occurs during the episode. Thus if the audience decides to change the perspective, a new character can be followed while still continuing with the same plot or storyline at the same point at which the switch occurred. Since the plot continues at the same pace from all three perspectives, the audience can change the perspective which is displayed on the screen numerous times while still viewing a coherent and chronological story.

In order to create the video images for the multi-perspective act, the same scene must be filmed from three separate perspectives. Since the same events occur in each of the three "films", each filmed frame will correspond to a separate filmed frame in each of the other two films. When the filmed scenes are transferred to videodisk 36, each of the three "films" becomes a separate series of images with each image in each series having a separate SMPTE time or other address. The time address for any image in the multi-perspective act has two corresponding time addresses, one in each of the other two series of images in the multi-perspective act.

At the beginning of the multi-perspective act the audience chooses the perspective from which it will begin viewing the act. Once the first choice is made, the perspective can be changed at any time during the act as often as the audience desires. In order to change the perspective, the control first passes to block 106, which determines whether the multi-perspective act is done. If the multi-perspective act is not complete, the control passes to block 108, where the main computer 30 polls the polling units 10 by sending a signal to the polling computer 28 which then retrieves the polling data from each of the junction boxes 20. The control then passes to block 110, where the results of the polling are tabulated. A choice is made by depressing pushbuttons 13–15, each pushbutton corresponding to one of the three perspectives, and thus one of the three series of images stored on videodisk 36.

After tabulating the results, control passes to block 112 to update the screen or display by displaying a tabulation image, which identifies the percentages of votes garnered by each of the three choices. Control then passes to block 114 to determine whether a threshold number of votes has been registered for one of the two perspectives which are not presently being displayed. The threshold will generally be more than 50% of the polling units 10 which are in use during the interactive performance. In order to determine how many polling units are in use, the audience may be asked to press any pushbutton during the introduction and the system will thereby calculate the threshold required to change the perspective.

If a new majority has not been reached, control passes to block 106 to determine whether the multi-perspective act has been completed and then returns to poll the units again. If a new majority has been reached, control passes to block 116 to switch the videodisk track so that the perspective with the new majority is displayed. In order to switch the videodisk track the main computer 30 must first determine the SMPTE time code or other address of the image which is presently displayed. The computer determines the address of the particular image in the new majority perspective which corresponds to the image which is then being displayed. The main computer 30 instructs the videodisk player 34 to display images in the new majority perspective beginning with the image which is one image following the particular image in the new majority perspective. After switching the videodisk track the computer determines whether the multi-perspective act is completed, and if not, polls the units again until another new majority is reached, at which time the videodisk track is switched once again.

Once the multi-perspective act terminates, the audience is no longer allowed to change the perspective and the program moves into the first scene of the branching act. In general fashion, during the branching act, a scene is displayed to the audience, at the end of which the audience is presented with three choices on the direction of the plot of the episode. Unlike the multi-perspective act, the three choices will lead to a different series of events or different plots. Once the audience has determined the direction in which the plot will continue, the main computer instructs the videodisk player to play the selected new series of images.

Now specifically, at the end of the newly selected branching scene the control passes to block 120 to determine whether the entire branching act is completed. If the branching act is not completed, control passes to block 122 to update a number of values stored in main computer 30. Updating these values would include such information identifying the scene being played and the SMPTE time code or other address for various images within that scene. In updating the values, the vote tabulation for each choice will be reset to 0, since any previous votes will be unrelated to any new vote in the branching act.

Once the values have been reset, control passes to block 124 to poll the units to determine what votes have been cast. Polling of the units for this portion of the presentation is accomplished in the same manner as described above wherein the main computer 30 sends a data request signal to the polling computer 28, which then receives information from the junction boxes 20. Once the units have been polled, control passes to block 126 to update the tabulation of votes. Control then passes to block 128 where updated information is sent by the main computer 30 to the projection unit 38 so that the tabulation can be overlaid on the images being displayed on the screen and the audience can monitor the voting while it is occurring.

After the screen or display has been updated, control passes to block 130 to determine whether the voting time is completed. At the end of each branching scene, when the audience is provided with three choices, a timer is displayed on the screen, for instance, ten seconds, which limits the voting period. Until that voting time is up, the polling units continue to be polled as control returns to block 120.

Once the voting time is up, control passes to block 132 to play the user choice or scene which has been selected at the greatest number of polling units. If, however, there is a tie in the voting, the audience is informed of the tie by use of the tabulation image, and control returns to block 122 so that voting can be repeated. Alternatively, a default may be used which will automatically select a scene for display when there is a tie in the voting. Selecting the scene to be played is done in part by using the values which were previously updated. From those values and the results of the voting, the SMPTE time code or other address for the beginning of the next scene or series of images can be determined by the main computer 30. The main computer 30 then sends a signal to the videodisk player 34 based upon the address which was calculated so that the videodisk player 34 will retrieve the proper series of images. After the results have been played, control once again passes to block 120 to determine whether the branching act is completed and then begins another round of polling or terminates the episode by passing to block 134 to play the credits. The voting process outlined here for the branching act may also be used to conduct the first vote of the multiperspective act in which the audience chooses the perspective from which to initially view the act.

Figure 3:
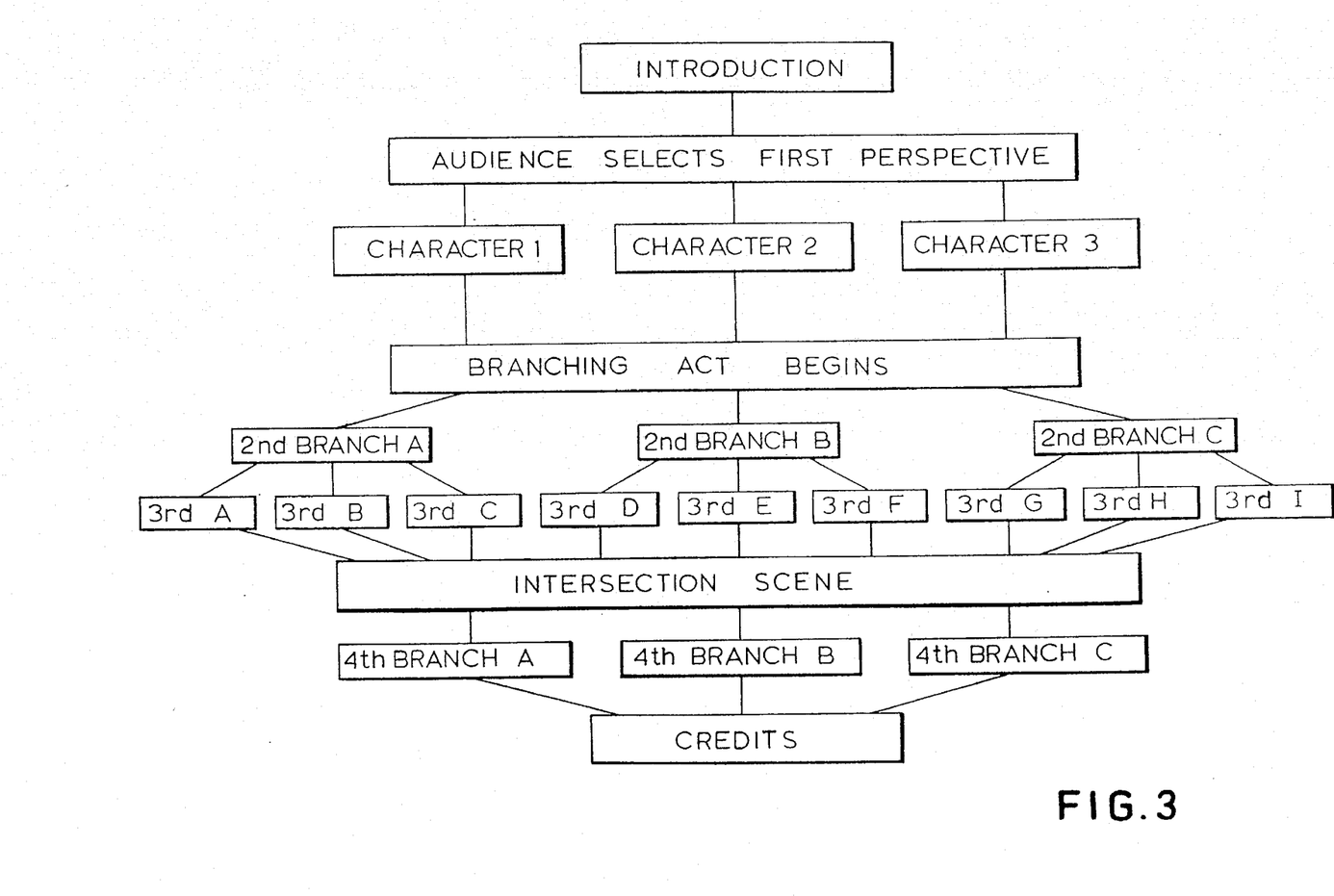
FIG. 3 is a generalized flowchart illustrating the series of images which may be displayed during an episode utilizing the interactive entertainment system.

FIG. 3 is a flowchart illustrating the images or series of images which are displayed during a sample episode. Time for the episode proceeds from the top of the flowchart to the bottom of the chart. The introduction is first played, at the end of which the audience selects the first perspective from which it will view the act. Once the audience has selected the first perspective, e.g., character 1, character 2 or character 3, the episode continues with that perspective until a new majority has been reached in the audience for one of the other two characters. For instance, if character 1 is selected initially by the audience, the episode will continue with character 1 until more than 50% of the audience votes for character 2 or more than 50% of the audience votes for character 3. When the new majority is reached, the new perspective is displayed until the audience votes for another perspective.

The multi-perspective act ends with the audience voting on which of the three characters to follow throughout the remainder of the episode. The decision on which character to follow for the remainder of the episode is the first branching level in the branching act. When the first branching act decision is made, a scene based on that decision is played. For instance, if the audience initially selects second branch A, when that scene terminates, the audience is once again given three choices, third branch A, third branch B and third branch C. If second branch B had initially been selected, the choice at the end of that branch would be between third branch D, third branch E or third branch F.

From one level of branching to another, the number of scenes is multiplied by three. Since each scene is preferably a minimum of approximately one minute to two minutes in length, the amount of storage capacity on the videodisk 36, usually only about thirty or forty-five minutes, can be rapidly depleted. In order to minimize the number of scenes which must be stored, intersection scenes can be used. An intersection scene brings all the various branches together in time. The branching then continues from the branching scene, but with only three branches at the fourth level, instead of 27, as would be necessary if the branching continued without an intersection scene from the 9 previous scenes. Another method of minimizing the storage space used for storing scenes is to have portions of scenes placed on the videodisk which can be used in more than one scene. For instance, Second Branch A may have a portion of a scene in which a character walks down a hallway. The script for Second Branch C might also call for the same character to walk down the same hallway. Instead of recording the hallway scene twice on the videodisk, those series of images can be placed on the videodisk once, and accessed as necessary by the main computer for any branch in the presentation.

At the end of the branching, credits are played. Credits could be played as an intersection scene, or credits could be placed at the end of each of the final branches.

Playing the multi-perspective act prior to the branching act has advantages in helping the audience become familiar with the system and its equipment. The multi-perspective act does not require voting in a limited length of time, but instead allows voting at any time and changing of votes as often as an individual desires. Thus, any delay in an individual becoming proficient in using the equipment will have little effect on the individual's ability to participate in the multi-perspective act. The branching act, on the other hand, requires voting in a short period of time so that inability to use the equipment quickly will prevent an individual from participating effectively.

The foregoing detailed description has been given for clearness of understanding only and no unnecessary limitations should be understood therefrom, as modifications will be obvious to those skilled in the art.

We claim:

1. An interactive entertainment system, comprising:

an image storage medium for storing images at addresses;

means for retrieving the images from the storage medium substantially instantaneously by accessing the images using the addresses;

a display coupled to the retrieving means;

means for communicating a list of choices of images from the storage medium to an audience; and means for conducting a poll of the audience including at least a pair of polling units, each unit having means for registering a user choice of images from the storage medium and means for producing a signal in response to the registered user choice and wherein the conducting means includes means coupled to the polling units for receiving the signal and for tabulating user choices;

wherein the conducting means automatically causes the retrieving means to access a first stored image at an address and supply the first stored image to the display based upon the tabulated user choices.

2. The system of claim 1 wherein the display presents a series of images, said series ending in at least one image which provides at least two choices, each choice corresponding to a further series of images stored in the storage medium.

3. The system of claim 2 wherein the storage medium comprises a videodisk.

4. The system of claim 3 wherein the retrieving means comprises a videodisk player.

5. The system of claim 3 wherein the display comprises a video projection system.

6. The system of claim 2 wherein the storage medium stores images at time addresses.

7. The system of claim 1 wherein each polling unit comprises at least two pushbuttons wherein each pushbutton corresponds to a user choice.

8. The system of claim 1 wherein each polling unit comprises a housing and each housing has a message readout.

9. The system of claim 1 wherein each polling unit comprises a housing and each housing is attached to a theater chair.

10. The system of claim 9 wherein each polling unit comprise a joystick and is attached to an armrest of the theater chair.

11. The system of claim 1 wherein the poll conducting means includes means for converting the signals from the polling units into further signals which are tabulated by the tabulating means.

12. The system of claim 1 wherein the conducting means further comprises means for sending a retrieval signal to the retrieving means to supply a second stored image when a user choice has been selected at a threshold number of the polling units.

13. The system of claim 12 wherein the storage medium stores at least two series of images, where images in each series correspond in time to images in each of the other series.

14. The system of claim 12 wherein the display presents a first series of stored images when a first user choice is selected at a first threshold number of the polling units and wherein the display subsequently presents a second series of stored images when a second user choice is selected at a second threshold number of the polling units.

15. The system of claim 14, wherein the first and second threshold numbers are equal.

16. The system of claim 14 wherein the storage medium stores at least two series of images, where images in each series correspond in time to images in each of the other series.

17. The system of claim 14 wherein each image in the first series corresponds in time to an image in the second series and wherein the retrieving means retrieves images in the second series beginning with an image in the second series corresponding to an image of the first series next following an image of the first series which was last retrieved from the storage medium.

18. The system of claim 1 wherein the tabulating means transmits a tabulation image to the display and the tabulation image overlays the image on the display retrieved from the storage medium.

19. The interactive entertainment system of claim 17 wherein:

the polling units are divided into at least two groups; and the conducting means includes at least two junction boxes, each junction box connected to a group of polling units, where each junction box records the user choices registered at the polling units within a group and transmits those choices to the tabulating means which causes the retrieving means to access a stored image.

20. The system of claim 19 wherein the junction boxes comprise a digital latch card for receiving and recording the signals from the polling units connected to a microprocessor via a bus.

21. The system of claim 20 wherein the microprocessor records the user choices as a string of characters and transmits the string of characters to the tabulating means.

22. An interactive entertainment system, comprising:

an image storage medium for storing images at addresses;

means for retrieving the images from the storage medium substantially instantaneously by accessing the images using the addresses;

means for communicating a list of choices of images from the storage medium to an audience;

a display coupled to the retrieving means; and means for conducting a poll of the audience including at least a pair of polling units, each unit having means for registering a user choice of the images from the storage medium and means for producing a signal in response to the registered user choice and, wherein the polling units are divided into at least two groups, the conducting means includes at least two junction boxes, each junction box is connected to a group of polling units for receiving the signals, and each junction box records the user choices registered at each polling unit within a group and transmits those user choices to a means for tabulating user choices;

wherein the conducting means automatically causes the retrieving means to access a first stored image at an address and supply the first stored image to the display based upon the tabulated user choices, the tabulating means transmits a tabulation image to the display and the tabulation image overlays the image on the display retrieved from the storage medium.

23. The system of claim 22 wherein the display presents a series of images, said series ending in at least one image which provides at least two choices, each choice representing a further series of images stored in the storage medium.

24. The system of claim 22 wherein:

the conducting means further comprises means for sending a signal to the retrieving means when a user choice has been selected at a threshold number of the polling units; and the storage medium stores at least two series of images, where images in each series correspond in time to images in each of the other series.

25. The system of claim 22 wherein:

the retrieving means comprises at least two videodisk players; and the videodisk players are connected to a routing switcher which receives images from the videodisk players and sends them to the display.

* * * * *